350-360

OR 4,035,061

United State

T350-360 ✓
X350-331 ✓

Sheridon

[11] 4,035,061

[45] July 12, 1977

[54] HONEYCOMB DISPLAY DEVICES

[75] Inventor: Nicholas K. Sheridon, Saratoga, Calif.

[73] Assignee: Xerox Corporation, Stamford, Conn.

[21] Appl. No.: 670,807

[22] Filed: Mar. 26, 1976

[51] Int. Cl.[2] .................... G02F 1/16
[52] U.S. Cl. .................... 350/161 S
[58] Field of Search .................... 350/161 S

[56] References Cited

U.S. PATENT DOCUMENTS

| | | | |
|---|---|---|---|
| 3,158,430 | 11/1964 | McNaney | 350/161 S |
| 3,667,830 | 6/1972 | Rottmiller | 350/161 S |

*Primary Examiner*—William L. Sikes
*Attorney, Agent, or Firm*—M. J. Colitz; T. J. Anderson; L. Zalman

[57] ABSTRACT

An optical display comprised of an array of small focusable image elements in conjuction with a corresponding array of optical stops or filters, one optical stop or filter being aligned with each image element. Upon the application of a force field to selected ones of the image elements, the optical focal point of those image elements is changed to thereby allow ambient light incident upon those image elements to be focused differently than it was prior to the application of the electric field whereby the optical stops aligned with the selected image elements intercept a different portion of the ambient light reflected or transmitted the selected image elements than do the optical stops aligned with non-selected image elements to thereby provide a display having light and dark areas.

16 Claims, 7 Drawing Figures

HONEYCOMB DISPLAY DEVICES

BACKGROUND OF THE INVENTION

In the early development of data display systems, it was customary to employ a cathode ray tube wherein a layer of phosphor material was made to luminesce by means of an electron beam that scanned across the layer of phosphor material. Although good quality images can be created in this manner, the physical size of the images that can be created by a cathode ray tube is severly limited by various factors, such as, for example, power required and distortion of the electron beam path. In order to provide images of greater size, numerous schemes have been proposed for optically enlarging an image created by cathode ray tube. Although an image of greater proportions can be obtained in this manner, the amount of light available from the phosphors present on the face of the tube is very limited. As a result, the quality of the enlarged image and particularly the brightness thereof has heretofore been very poor.

Cathode ray tubes have also been utilized in systems which employ a projection system having a light source which is independent of the cathode ray tube light emission. For example, in U.S. Pat. Nos. 3,667,830; 3,701,586; 3,609,222; and 3,746,785, large scale displays are provided by utilizing a display structure having a deformable, light reflective metalic film supported by a support grid which is situated within a cathode ray tube. When an electron beam scans across the display structure, charge accumulates on areas of the display structure in accordance with the information content of the electron beam. This charge accumulation causes small deformations or dimples to form in the metal film at the areas of the charge accumulation. When light from a projection system is directed upon the metal film, only light which strikes the deformed areas reaches a display screen. Thus, a light image is formed on the display screen corresponding to the dimpled image formed in the metal film by the electron beam. A flood gun must be provided within the cathode ray tube to neutralize the charge areas to thereby allow the deformations in the metal film to relax to the non-deformed or normal position.

The size limitations of display systems using cathode ray tubes has led to the use of matrix addressed displays when large displays are required. In a matrix display, pairs of conductors in a two-dimensional array of such conductors are utilized to address each elemental area of the display to thereby initiate the emission of light at a selected elemental area when the pair of conductors associated with that selected elemental area are properly biased. in such a display system, as described in U.S. Pat. No. 3,091,876, when a selected elemental area is properly biased, a pressure valve is opened which forces a portion of a flexible membrane out past the end of a tubular support member. In this outer position, the reflective surface of the membrane reflects incident light to provide a visible "bright spot" in the surface of the display to thereby provide a visible display. U.S. Pat. No. 3,091,876 also teaches using an electroluminescent panel in conjunction with the flexible membrane whereby when an elemental portion of the membrane is addressed, the membrane is forced by a pressure system into contact with an electrode of the electroluminescent panel whereby a voltage is applied across an elemental area of the electroluminescent panel to thereby cause it to emit visible light.

As noted, the display systems described which utilize cathode ray tubes suffer from size limitations and the expensive cathode ray tube component. Also, these systems do not use ambient light as the projection light source. The matrix display systems that utilize a pressure source also suffer from the requirement of expensive mechanical components and also, especially when using an electroluminescent panel, from the lack of a threshold behavior since the elemental areas adjacent a selected elemental area receive half the voltage applied across the selected elemental area and that voltage may be sufficient to initiate undesirable glow discharges and hence undesirable light output at areas adjacent the selected elemental area. Also, many of the display systems described do not have machine readable capabilities.

OBJECTS OF THE INVENTION

It is an object of the present invention to provide an improved optical display.

It is a further object of the present invention to provide an improved optical display that is flat.

It is a further object of the present invention to provide an improved optical display that uses ambient light.

It is a further object of the present invention to provide an improved optical display that can be addressed by existing electronics.

It is a further object of the present invention to provide an improved optical display that has a threshold behavior.

It is a still further object of the present invention to provide an improved optical display that is machine readable.

SUMMARY OF THE INVENTION

In accordance with the present invention, the foregoing objects are achieved by an array of focusable image elements in conjunction with a corresponding array of optical stops or filters, one optical stop or filter for each image element. Each of the focusable image elements is addressed in a matrix manner whereby a force can be created at selected image elements to change the focal point of the light reflected or transmitted by those selected image elements. The change in the focal point of the selected image elements causes some of the ambient light reflected or transmitted by those image elements to bypass the optical stops associated with those image elements which optical stops would otherwise absorb most, and desirably all, of the light reflected from or transmitted by those elemental areas had the focal point of those focusable image elements not been changed. Thus, the change in the focal point of selected image elements or areas of the display is used to provide a visible display which utilizes ambient light and existing switching technology. In addition, the display of the invention exhibits a sharp threshold behavior which enables the number of peripheral address elements to be held to a manageable quantity.

In one embodiment of the invention, the focusable image elements are light reflectors which are provided over a perforated support sheet having a perforation for each image element. The reflectors can be spherical or paraboloidal indentations in a flat sheet, suitably coated for optical reflectivity and electrical conductivity, and stretched over the perforations of the support sheet. The indentations are "popped" between concave and convex curvatures to provide the desired change in focal point required for selected image elements to provide a display. Light reflection and light transmission modes of operation are feasible.

In another embodiment of the invention, the focusable image elements are liquid metal slugs in a honeycomb of support tubes. Addressed slugs can be moved to change their focal point, or the shape of a surface of addressed slugs can be changed to change their focal point, with a change in focal point either causing ambient light to bypass optical stops or impinge upon optical stops to provide the desired display.

DETAILED DESCRIPTION OF THE INVENTION

Figure 1:
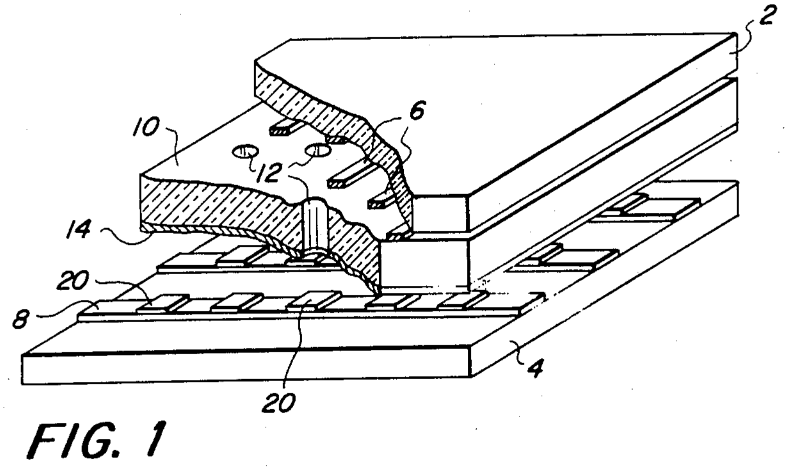
FIG. 1 is a perspective view of one embodiment of a display in accordance with the invention.

Referring now to FIG. 1, there is shown a display system in accordance with the invention including displaced electrically insulating substrates 2 and 4 which support electrically conductive matrix switching electrodes 6 and 8, respectively. Electrodes 6 run in one direction and electrodes 8, which preferably are optically transparent, run in a transverse direction, as shown in FIG. 1, to provide a plurality of matrix cross-over points to provide for matrix addressing. A perforated electrically insulating sheet or grid 10 is disposed between the substrates 2 and 4 with a perforation 12 aligned with each matrix cross-over point.

Figure 2:
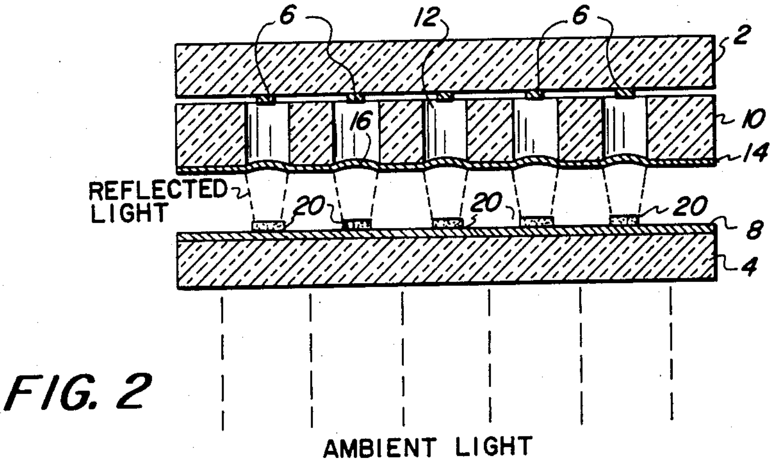
FIGS. 2 and 3 are side views of the display of FIG. 1 showing operation of that display.

The insulating sheet 10 supports on one surface thereof a thin electrically conductive surface layer 14 which has a poppable or deformable portion 16 over each of the perforations 12. Layer 14 can be a layer of metallic material suitably deposited to have good light reflecting properties or can be a laminated elastic structure having a light reflective surface oriented toward substrate 4. The deformable portions 16 of layer 14, which can be, for example, spherical or paraboloidal indentations in the otherwise flat plane of layer 14, can exist in two stable states, that is, concave away from substrate 4 or convex towards substrate 4. For purposes of illustration, the portions 16 are shown in FIG. 2 as concave away from substrate 4.

A planar array of optical stops or filters 20 is supported by the electrode-carrying surface of substrate 4. There is one optical stop or filter for each of the deformable portions 16, with each optical stop or filter being located along the central longitudinal axis of each of the perforations 12. Stops 16 can be any light absorbing material.

When properly constructed, all of the deformable portions 16 will initially be in either the concave away or convex toward substrate 4 configuration, depending upon whether the display is to provide a light image on a dark background or a dark image on a light background. FIG. 2 illustrates the light image on dark background display, with the deformable portions 16 concave away from substrate 4 such that a substantial portion of the ambient light passing through substrate 4 and transparent electrodes 8 is incident upon deformable portions 16 and, as a result of the curvature of portions 16, is focused by portions 16 upon their related optical stops 20. Since the optical stops 20 are light absorbing, the display of FIG. 2 will appear dark. The dimensional relationship between the size of perforations 12 and hence the size of deformable portions 16, the size of stops 20, and the distance between stops 20 and deformable portions 16 is such that substantially all of the ambient light reflected by portions 16 (when in their initial curvature) falls upon stops 20. The dimensional relationship alluded to will be apparent to those skilled in the art. However, it is recommended that the spacing of the stops 20 from the deformable portions 16 be about twice the width or diameter of the perforations 12. For example, if the perforations 12 are cylindrical with a diameter of 2–3 mils, the spacing between portions 16 and stops 20 should be about 4–6 mils.

The layer 14 is sufficiently thin and lacking in thickness so that the application of a high voltage at one of the matrix cross-over points provides sufficient electrostatic attraction to cause the deformable portion 16 associated with that matrix cross-over point to "pop" from a configuration concave away from substrate 4 to convex toward substrate 4. The magnitude of the applied voltage required to pop a selected deformable portion 16 is, of course, controlled by the geometry of the portions 16 and their spacing from the electrodes 6 and 8. These voltage requirements will be readily apparent to one skilled in the art. The operation of causing the deformable portion 16 to pop from one stable state to the other requires three electrodes. These are the electrodes 6 and 8 and the conducting portion of the layer 14. The fields between these electrodes would be normally so constituted that there would be an attractive force between the layer 14 and one set of electrodes, toward which the portions 16 are initially popped. There would be no attractive fields between the conductive deformable layer 14 and the second set of electrodes. The electrical field normally maintained between the layer 14 and the first set of electrodes would be less than that required to pop the elements 16 from one state to another. To cause an element 16 to pop to its opposite state, the voltage between it and the corresponding row of first electrodes would be substantially reduced or removed. At the same time, the electrical field between it and the corresponding column of the second set of electrodes would be increased to a value slightly greater than the threshold field required to pop an element into the other state. Only the element 16 at the intersection of the row of first electrodes and the column of second electrodes will experience a greater-than-threshold net field and pop. To erase, the field with respect to the first electrodes is raised above the threshold level. It should be noted that the conductive deformable layer 14 may be a single conductor or a plurality of conductive strips. The latter configuration allows some simplifications in the address electronics. Also, the individual row or column electrodes of electrode sets 6 and 8 may be comprised of a plurality of two or more electrodes independently accessed, thereby allowing still further simplifications in the address electronics.

Figure 3:
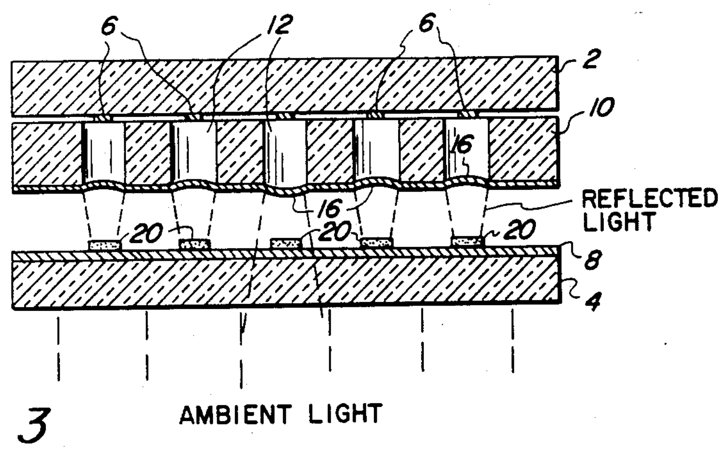

Relating now to FIG. 3, the central matrix cross-over point of the one matrix row shown has been addressed with sufficient voltage applied to electrodes 6 and 8 to pop the central deformable portion 16 from concave toward electrode 8 to convex toward electrode 8. Due to the change in the focal point of the central deformable portion 16 resulting from its new shape, a substantial portion of the ambient light incident thereon will be reflected around or past the optical stop 20 associated with that deformable portion, as shown schematically by the beam *p* in FIG. 3 and the central area of the display row will appear light. In this manner, images are formed using only ambient light and no external optics.

Figure 2A:
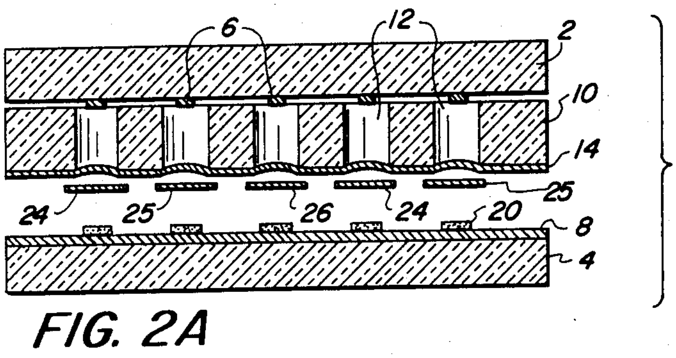
FIG. 2A is a side view of display for providing color images.

Gray scale capabilities can be provided by increasing the density of deformable portions 16 per unit area. Color images can be obtained by using three deformable portions 16 per unit area of the display, each deformable portion having adjacent thereto a transparent color filter of appropriate hue, as shown in FIG. 2A by red, blue and green filters 24, 25 and 26, respectively, situated between electrode 8 and layer 14.

As described, the display system of the present invention uses only ambient light, is flat and is theoretically unlimited in size, and requires no external optics for viewing. In addition, the display of the present invention is easily addressable by standard matrix switching techniques, and is machine readable since the change in shape of portions 16 will change the capacitance between portions 16 and the electrodes 6 and 8, with the change in capacitance being monitored by conventional apparatus to provide the desired machine readability.

The perforated electrically insulating sheet 10 can be comprised of an array of parallel glass capillary tubes fused together in a uniform and mechanically rigid matrix. The tubes can have a circular or square cross section, although other shapes will also produce satisfactory results. In lieu of fused tubes, sheet 10 can be a glass or plastic sheet which, after being metallized on one surface to provide a layer 14, is etched through from the other surface using standard photolithographic techniques and selective etchants to provide the perforations 12. Alternatively, the metal layer 14 can be applied after the glass or plastic sheet is etched.

Any suitable light reflecting material can be used for layer 14. Desirably, the material of layer 14 will be capable of many flexings or poppings without fatigue. While any suitable layer thickness can be used for layer 14, good results will be obtained in the case of a solid metal layer with a layer thickness between one tenth and two microns. Substantially thinner layers lack mechanical strength, while substantially thicker layers do not have the desired flexure characteristics at reasonable potentials. Typical materials for layer 14 include silver, aluminum, copper, nickel, and gold indium alloys. These materials, and especially gold indium alloys, can be deposited in such a manner that they tend to expand their surface area upon deposition and hence will provide deformable portions concave away from its support surface as shown in FIG. 2. The layer 14 may also be formed from a metallized elastomer. Upon the perforated support 10 is laid a thin sheet of elastomer material, such as a plasticized dimethyl polysiloxane. This sheet would be 1 to 25 microns thick, and preferably 3 microns thick, and it will tend to adhere to the solid portions of the surface of perforated sheet 10. The surface of the layer 14 would next be metallized with a metal or metal alloy, mentioned above, which tends to expand its surface area upon application, creating the deformable spheroidal sections on unsupported areas of layer 14. Alternatively, the elastomer layer might be plasticized by, for example, immersion in a suitable liquid, after application to the perforated support 10. This will cause the elastomer to swell, generally resulting mainly in a thickness change where supported and an area and thickness change adjacent to the perforations 12, creating the desired spheroidal indentations. This structure would be subsequently metallized, for example, by vacuum evaporation, to obtain electrical conductivity and optical reflectivity.

Figure 4:
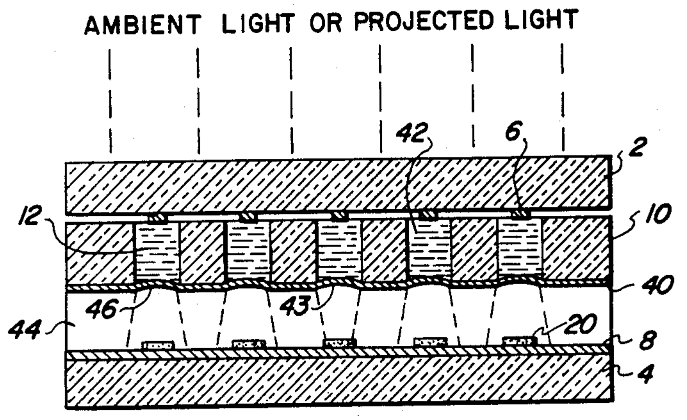
FIG. 4 is a side view of another embodiment of a display in accordance with the present invention.

The display described in relation to FIGS. 1, 2 and 3 operates in a light reflection mode with light being reflected from deformable portions 16. In the display illustrated by FIG. 4, wherein parts corresponding to the like parts of the display of FIGS. 1–3 have the same reference numerals, an embodiment of the invention is illustrated which operates in a light transmission mode. All of the perforations 12 operate as closed systems being sealed at both ends by light transmitting substrate 2 and light transmitting layer 40. Each perforation 12 is filled with a liquid 42 having a light focusing characteristic, such as, for example, a Dow Corning 200 Series silicon oil or a fluorosilicone oil. To equalize the pressure on the layer 40 caused by the liquid 42, the space 44 between layer 40 and substrate 2 is pressurized or filled with a liquid having a refractive index different from the refractive index of the liquid 42. When selected of the deformable portions 46 of layer 40 are popped, as described in relation to FIGS. 1–3, so that they are convex toward substrate 4, the lower surface 43 of the liquid 42 filling the perforations 12 corresponding to those selected deformable portions becomes convex towards substrate 4 and ambient light passing into the display via substrate 2 is made to converge upon the optical stops 20 aligned with those selected deformable portions 46 to provide dark display areas. With the deformable portions of layer 40 flexed concave away from substrate 4, the liquid 42 acts to diverge light passing into the display via substrate 2 to provide light display areas. In FIG. 4, the central deformable portion 46 provides a dark display area and the remainder of the deformable portions 46 provide a light display area.

Figure 5:
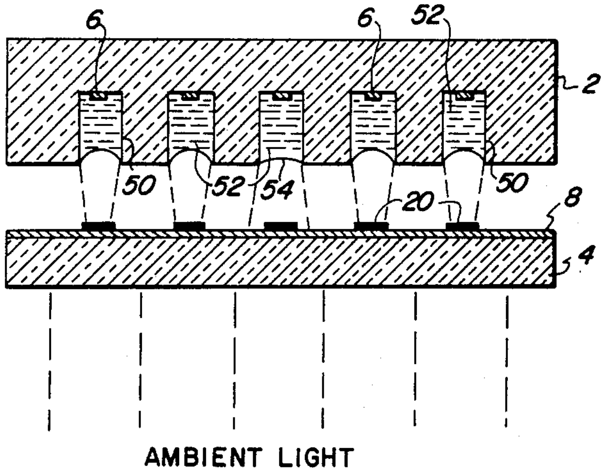
FIG. 5 is a side view of still another embodiment of a display in accordance with the present invention.

The change in the focal point of ambient light utilized to provide a display can be provided by means other than by popping a material into a different shape. In FIG. 5, substrate 2 has wells 50 therein which are filled with a liquid metal 52 which does not wet the side walls of the wells. For example, the liquid metal 52 can be mercury or an indium/gallium alloy. The cross-sectional area of the wells 50 is such that the liquid metal 52 is held within the wells by means of capillary force. When selected wells 50 are accessed by applying appropriate potentials to selected of the electrodes 6 and 8, in the manner described in relation to FIGS. 1–3, electrostatic forces are created in those cells which tend to flatten the "free" surface or open end surface 54 of the liquid metal of those cells, as shown by the middle cell of FIG. 5. The change in surface shape of the liquid in the selected wells will cause light incident on those wells to be reflected past the optical stops associated therewith to provide light display areas. At the wells that are not accessed, the incident ambient light is reflected by the surface of the liquid metal to the optical stops and those wells provide "dark" display areas. Unlike the previously described embodiment, this embodiment does not have an electrical field activation threshold or a memory capability.

Figure 6:
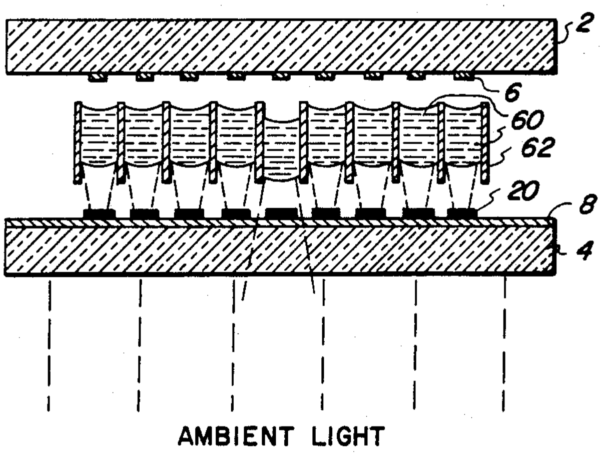
FIG. 6 is a side view of yet another display in accordance with the present invention.

In the display of FIG. 6, the change in the focal point of the light incident upon a display is provided by moving slugs of liquid metal 60 within the tubes 62 of a capillary array of such tubes. When a matrix cross-over point is accessed, the potential applied to the slug of liquid metal in the tube 62 corresponding to that accessed cross-over point causes the liquid metal to move in the tube to thereby change the focal point of the incident ambient light falling on the tube array. In FIG. 6, the central capillary tube has been accessed to provide a downward movement of the liquid metal in that tube such that the incident ambient light is reflected past the central stop 20. Good movement of the capillary slugs can be achieved by utilizing capillary tubes about 10 mils or less in diameter and mercury as the liquid metal since mercury is an example of a liquid metal which will not wet the capillary tubes. Experience has shown that such liquid slugs will not move in the capillary tube until a threshold electrical field has been exceeded. When moved to a new position in the tube, they cannot return to their initial position until an electrical field in the reverse direction and in excess of a threshold valve is applied. Hence, this embodiment has both a sharp threshold and memory.

What I claim is:

1. An optical display system comprising:

an array of focusable imaging elements, an array of light absorbing elements, one of said array of light absorbing elements being aligned with each one of said focusable imaging elements, and means for changing the focusing point of the light rays incident upon selected of said imaging elements whereby the light rays incident upon said selected imaging elements are focused differently than is the light rays incident upon other of said imaging elements such that the amount of light rays falling upon the light absorbing elements aligned with said selected imaging elements is different than the amount of light rays falling upon said light absorbing elements aligned with said other of said imaging elements.

2. The optical display system of claim 1 wherein said array of focusable imaging elements is provided by deformable portions of a thin layer of electrically conductive material.

3. The optical display system of claim 2 wherein said means of claim 1 changes the curvature of selected of said deformable portions such that the light rays falling upon said selected of said deformable portions is focused differently than is the light rays incident upon other of said deformable portions.

4. The optical display system of claim 3 wherein said thin layer of electrically conductive material is supported by an electrically insulating substrate, said substrate having a depression adjacent each of said deformable portions such that said deformable portions can change their curvature.

5. The optical display system of claim 3 wherein said thin layer of electrically conductive material is supported by an electrically insulating substrate having a hole adjacent each of said deformable portions of said thin layer.

6. The optical display system of claim 4 wherein each of said depression is filled with a liquid, the liquid of each depression changing its surface contour when the deformable portion associated therewith changes its curvature.

7. The optical display system of claim 5 wherein each of said holes is filled with a liquid, the liquid of each hole changing its surface contour when the deformable portion associated therewith changes its curvature.

8. The optical display system of claim 1 wherein said array of focusable imaging elements is provided by separate pools of a liquid metal.

9. The optical display system of claim 8 wherein said means of claim 1 changes the surface contour of selected of said liquid metal pools such that the light rays falling upon said selected of said liquid metal pools is focused differently than is the light rays incident upon other of said liquid metal pools.

10. The optical display system of claim 8 wherein said pools are contained within holes in an electrically insulating substrate, said means of claim 1 changing the contour of the free surface of selected of said pools such that the light rays falling upon said selected of said pools is focused differently than is the light rays incident upon other of said pools.

11. The optical display system of claim 1 wherein said array of focusable imaging elements is provided by a plurality of columns of a liquid metal within an array of capillary tubes.

12. The optical display system of claim 11 wherein said means of claim 1 changes the position of selected columns of said liquid metal in the capillary tubes associated with said selected columns such that light rays falling upon said selected columns of liquid metal are focused differently than is the light rays incident upon other of said columns of liquid metal.

13. The optical display system of claim 1 wherein color filters are disposed between at least some of said focusable imaging elements and the light absorbing elements associated with some of said focusable imaging elements.

14. The optical display system of claim 1 wherein said means changes the electrical field across said selected imaging elements.

15. The optical display system of claim 1 where said means is comprised of a first array of electrical conductors having a given longitudinal direction and a second array of electrical conductors extending in a direction different from the direction of said first array to define a plurality of conductor crossover points in alignment with said focusable imaging elements and means for applying a potential of a selected magnitude to the crossover points aligned with said selected imaging elements.

16. An optical display system comprising:

a plurality of light absorbing elements, a plurality of optical elements, one of said optical elements being aligned longitudinally with each one of said light absorbing elements, each of said optical elements having a normal focal point, and means for changing the focal point of selected of said optical elements such that the amount of light incident upon the light absorbing elements aligned with said selected imaging elements is different than the amount of light incident upon the light absorbing elements aligned with the non-selected image elements.

* * * * *